E. A. ANDERSON.
VARIABLE SPEED GEARING.
APPLICATION FILED AUG. 7, 1913.

1,103,926.

Patented July 21, 1914.

WITNESSES
M. R. McInnis
E. A. Paul

INVENTOR
EMIL A. ANDERSON
BY Paul Paul
ATTORNEYS

UNITED STATES PATENT OFFICE.

EMIL A. ANDERSON, OF SWEA CITY, IOWA.

VARIABLE-SPEED GEARING.

1,103,926.  Specification of Letters Patent.  Patented July 21, 1914.

Application filed August 7, 1913. Serial No. 783,575.

*To all whom it may concern:*

Be it known that I, EMIL A. ANDERSON, a citizen of the United States, resident of Swea City, county of Kossuth, State of Iowa, have invented certain new and useful Improvements in Variable-Speed Gearing, of which the following is a specification.

My invention relates to a variable speed gearing and the object of the invention is to provide a simple, compact mechanism by means of which the driven member can be operated at a variable speed from the driving member.

A further object is to provide a mechanism composed of comparatively few parts and strong and durable in construction.

Other objects of the invention will appear from the following detailed description.

The invention consists generally in various constructions and combinations, all as hereinafter described and particularly pointed out in the claims.

Figure 1:
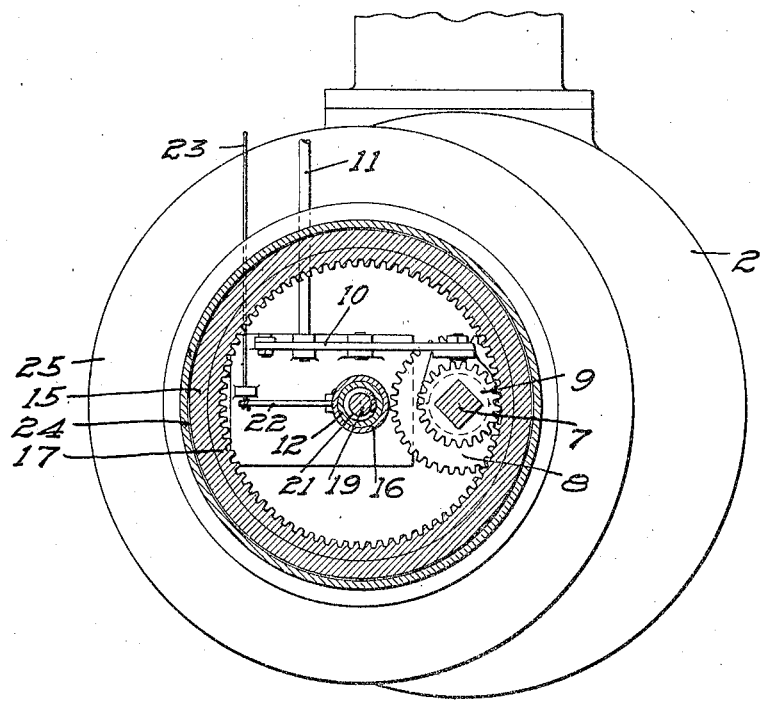
Figure 2:
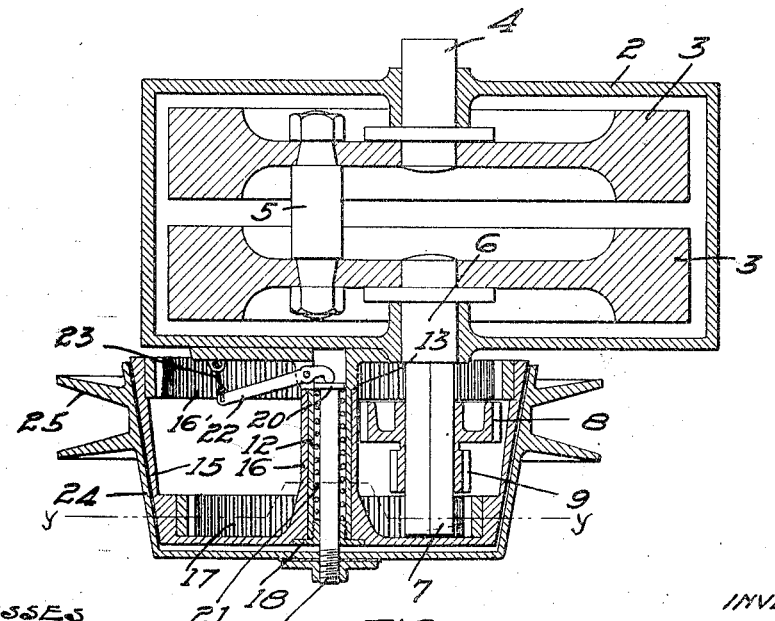

In the accompanying drawings forming part of this specification, Figure 1 is a sectional view taken on line y—y of Fig. 2, of a variable speed gearing embodying my invention, Fig. 2 is a horizontal sectional view of the same.

In the drawing, 2 represents a suitable casing, in which the fly wheels 3 of the engine are mounted.

4 is a driving shaft, on which one fly wheel is mounted and 5 is a crank pin connecting one fly wheel with the other and forming with the driving shaft and the stud 6 the crank shaft of the engine. This is an ordinary construction and I make no claim to the same herein. The stud 6 is concentric with the driving shaft 4 and is provided with an outer end 7 projecting outside the casing and rectangular in cross section. On this projecting portion of the stud gears 8 and 9 of different size are slidably mounted. Any suitable means may be provided for moving these gears back and forth on the stud, but I prefer to provide a bell crank 10 having an operating rod 11. A hollow stud 12 is secured on the casing 2 eccentric with respect to the driving shaft and is provided with a shoulder 13. A cone 15 has a hub 16 that is journaled on the stud 12, the inner end of the hub being seated against the shoulder 13. This cone is free to revolve on the stud and is provided at its inner, larger end with an internal gear ring 16' and at its outer or smaller end with a similar internal gear ring 17. Between these gears a space is provided within the cone to receive the gears 8 and 9 when in their neutral position. When the gears are moved inwardly by the movement of the operating rod, the gear 8 will mesh with the gear ring 16' and temporarily lock the cone 15 and when the gear 9 is moved outwardly, it will engage the gear ring 17 and also lock the cone. The outer end of the hollow stud 12 is provided with a threaded cap 18. A pin 19 fits within a hollow stud 12 and has a head 20 at its inner end between which head and the cup 18 a compression spring 21 is arranged. A lever 22 is pivoted near one end in the stud 12 and has its short arm arranged to bear on the inner end of the pin 19, while its opposite arm is connected to an operating means such as a cord 23. The spring 21 normally tends to hold the pin 19 in its retracted position within the stud and is put under compression when the lever 22 is operated to force the pin outwardly. A second cone 24 is mounted on the outer end of the pin 19 concentric with the cone 15 and encircling the same and is provided with an exteriorly arranged pulley 25. These cones have opposing friction surfaces and normally these surfaces will be in contact with one another to transmit power from the driving shaft to the pulley 25, the cones 15 and 24 forming, in effect, two members of a friction clutch, the speed of which is controlled by the internal gearing.

The shifting device for operating the gears 8 and 9 is mounted thereon between the gears in the usual way, allowing the gears to turn freely therein with the revolution of the driving shaft. Normally, the two cones will be in frictional engagement with one another and when the gears are moved from their neutral position the cones will be revolved, either at fast or slow speed, depending upon the adjustment of the transmission gears. At any time while the gears are in mesh the operator can move the lever 22, separating the cones and stopping the driven member, while the inner cone may continue to revolve until the gears 8 and 9 are shifted to their neutral position.

My variable speed gearing is adapted for use generally where devices of this kind are employed, and is particularly designed for use with a motor cycle, as it is simple and compact and can be easily operated to change the speed of the machine.

I claim as my invention:

1. The combination, with a driving shaft, of two concentric cones having opposing friction surfaces normally held in yielding engagement with one another and eccentrically mounted with respect to said driving shaft, the inner cone having internal gear rings of different sizes, and said driving shaft having gears thereon of different sizes adapted to mesh respectively with said gear rings, said outer cone having means for connection with a driven member.

2. A variable speed gearing comprising a driving shaft, concentric cones having opposing friction surfaces eccentrically mounted with respect to said driving shaft, the inner cone having internal gear rings of different sizes, gears of different sizes mounted on said driving shaft to mesh respectively with the gear rings, means for yieldingly holding said outer cone in frictional engagement with said inner cone, and means for shifting said gears to vary the speed of said cones.

3. The combination, with a driving shaft, of two concentric members having opposing friction surfaces normally held in yielding engagement with one another and eccentrically mounted with respect to said driving shaft, the inner member having internal gear rings of different sizes, said driving shaft having gears thereon of different sizes adapted to mesh respectively with said gear rings, said outer member having means for connection with a driven member.

In witness whereof, I have hereunto set my hand this 2nd day of Aug. 1913.

EMIL A. ANDERSON.

Witnesses:
C. W. PEARSON,
O. R. ROWLEY.